Figure 3:
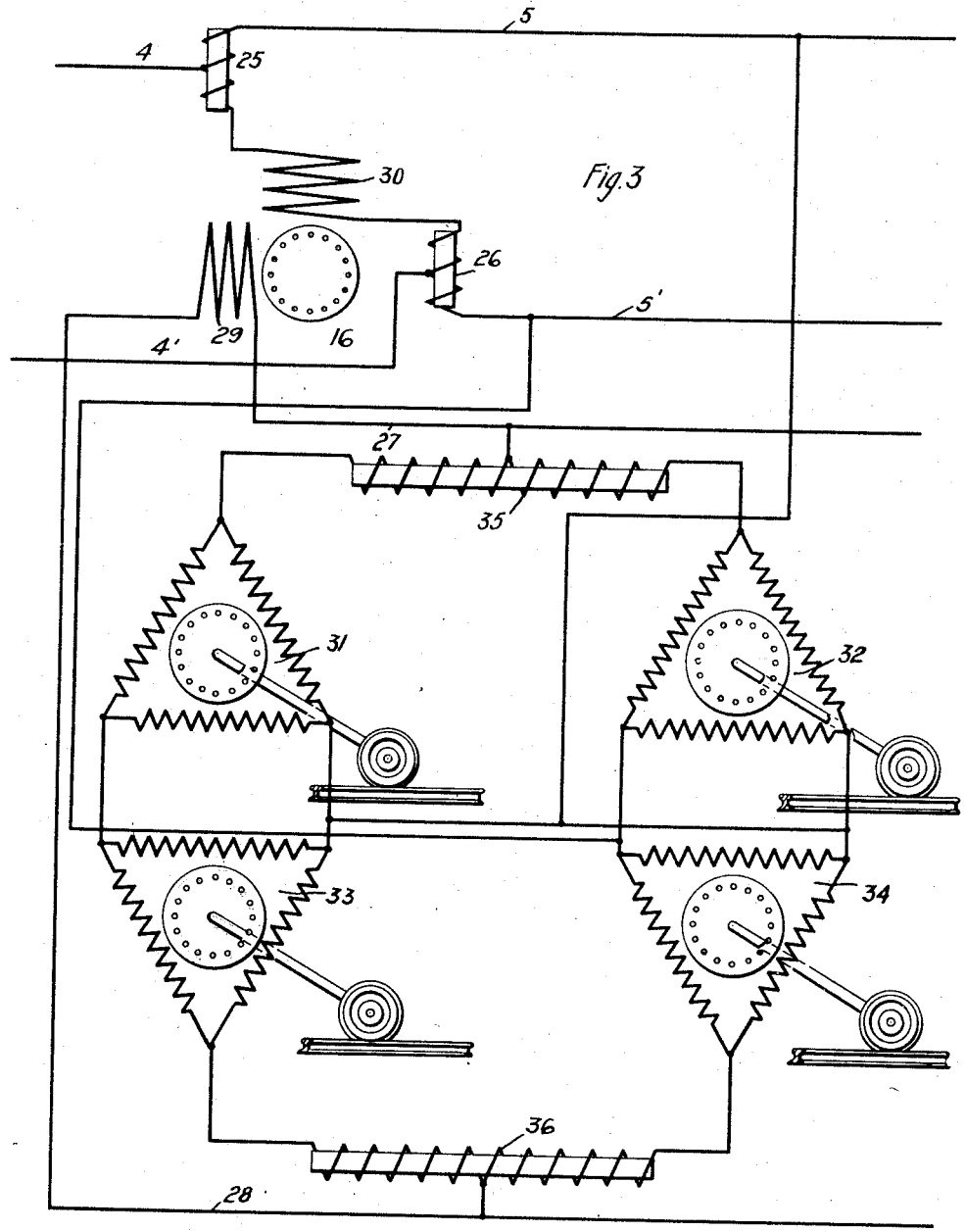

C. LE G. FORTESCUE.
PHASE CONVERTING AND BALANCING SYSTEM.
APPLICATION FILED SEPT. 28, 1917.
1,280,007.
Patented Sept. 24, 1918.
2 SHEETS—SHEET 1.
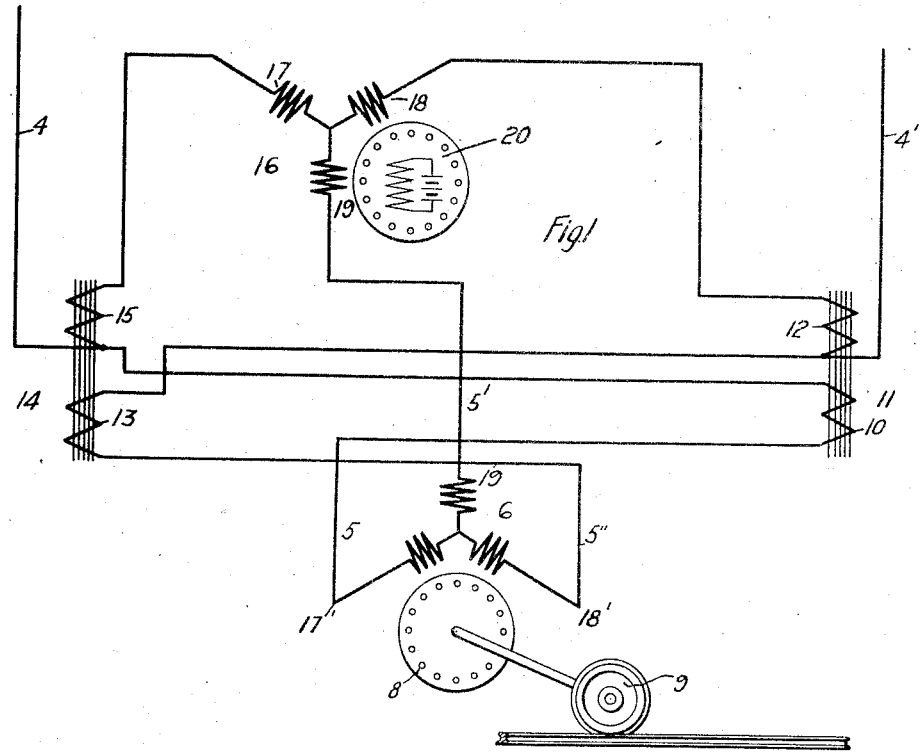
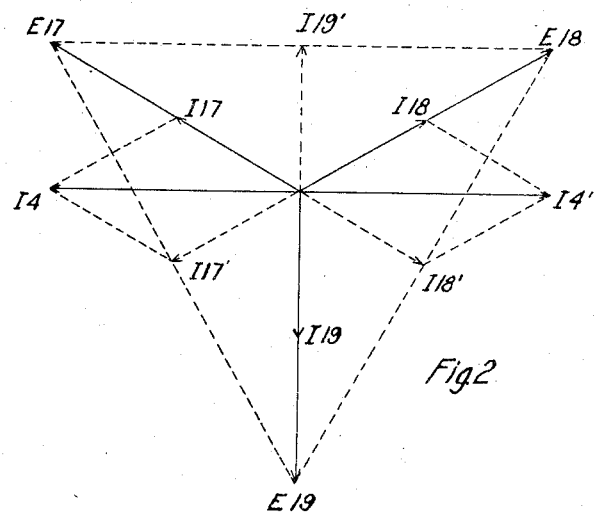
WITNESSES:
J. T. Wurmb.
D. C. Davis
INVENTOR
Charles Le G. Fortescue
BY
Wesley G. Carr
ATTORNEY C. LE G. FORTESCUE.
PHASE CONVERTING AND BALANCING SYSTEM.
APPLICATION FILED SEPT. 28, 1917.

1,280,007.

Patented Sept. 24, 1918.

2 SHEETS—SHEET 2.

WITNESSES:

INVENTOR
Charles LeG. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE CONVERTING AND BALANCING SYSTEM.

1,280,007.  Specification of Letters Patent.  Patented Sept. 24, 1918.

Application filed September 28, 1917. Serial No. 193,726.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase Converting and Balancing Systems, of which the following is a specification.

My invention relates to systems of electrical conversion, such as are commonly employed to interlink single-phase and polyphase circuits, and it has for one of its objects to provide simple and effective means whereby, when the single-phase circuit is energized from the polyphase circuit, the load thereof shall be uniformly distributed over the different phases of the polyphase circuit.

Another object of my invention is to provide similar means whereby, when the polyphase circuit is energized from the single-phase circuit, the different voltages and currents thereof shall remain substantially balanced, irrespective of ohmic and inductive drops in the converting apparatus.

In the accompanying drawings, Figure 1 is a diagrammatic view of a converting system embodying a preferred form of my invention; Fig. 2 is a vector diagram illustrating the operation of the system of Fig. 1; and Fig. 3 is a diagrammatic view of a modification of the system shown in Fig. 1, particularly adapted for application to electric locomotives.

Systems of electrical conversion are well known wherein a single-phase circuit, a polyphase circuit and a phase-converter, as of the dynamo-electric type, are so associated as to permit energy transfer from one of said circuits to the other. Thus, where the polyphase circuit is of the three-phase type, for example, two mains thereof are connected directly to the mains of the single-phase circuit, or through a transformer. The phase converter is also connected to the mains of the single-phase circuit, on its primary side, and, on its tertiary side, is connected to the third main of the three-phase circuit, the desired polyphase electromotive forces being obtained by the composition of the tertiary voltage of the phase-converter with desired portions of the electromotive force of the single-phase circuit.

When a system of this character is operating to transfer energy from the single-phase circuit to the polyphase circuit, the effect of the ohmic and inductive drops in the phase-converter is to alter the magnitude and shift the phase of the tertiary electromotive force thereof, resulting in an alteration of the magnitude and phase position of its electromotive forces supplied to the polyphase circuit which embody said tertiary voltage as a component, thus unbalancing the three-phase circuit.

When, on the other hand, a system of this character is employed to transfer energy from the polyphase circuit to the single-phase circuit, the momentum of the phase converter rotor, or the energy-storing function of other types of phase-converting apparatus, serves to distribute the single-phase load, with its pulsating torque substantially uniformly over the different phases of the polyphase circuit having substantially constant wattage, but, even under these conditions, the effect of the ohmic and inductive drops in the phase-converter is to disturb the otherwise symmetrical distribution of the load, overloading certain phases of the polyphase circuit and underloading other phases thereof.

In accordance with my invention, I find that, by inductively interlinking certain leads connecting the phase-converter to the single-phase circuit with certain leads connecting the single-phase circuit and the polyphase circuit, the above-mentioned effects of the ohmic and inductive drops may be substantially neutralized.

In carrying out my invention, I preferably inductively interlink leads wherein the currents may be arranged to have a relative phase displacement of 180°, under balanced load conditions, so that substantially no flux is produced in the transformer and, accordingly, the power-factor is unaffected thereby.

Referring to the drawing for a more detailed understanding of my invention, I show the mains of a single-phase circuit at 4—4' in Fig. 1. Said mains are shown as connected to supply energy to a polyphase circuit 5—5'—5'' that is shown as including a three-phase propulsion motor 6 of the induction type, said motor comprising a primary winding 7 and a secondary winding 8 and being coupled to a vehicle wheel 9.

For the supply of energy to the circuit 5—5'' from the circuit 4—4', the main 4 is connected to the main 5 through the winding 10 of a transformer 11 and, in like manner, the main 4' is connected to the main 5'' through the winding 13 of a transformer 14. A phase-converter 16, of the dynamo-electric type, is employed to transfer the energy of displaced phase and is shown as of the Y-connected type, although a T or delta-connected machine might be employed. The primary terminals 17 and 18 of the machine 16 are connected to the mains 4—4' through the windings 12 and 15, respectively, of the transformers 11 and 14, and the tertiary terminal 19 is connected to the remaining lead 5' of the three-phase circuit, as shown. The transformers 11 and 14 are indicated as having substantially one-to-one ratios and the windings thereof are so connected that the currents in the two windings of a given transformer, under conditions of load balance, are substantially in phase-opposition.

The general operation of a system of the character described will be readily understood and needs but little explanation. Suffice to say, one phase of the polyphase circuit 5—5'—5'' is energized directly from the single-phase circuit 4—4' and the remaining two phases of said polyphase circuit are energized by electromotive forces produced by the composition of the tertiary voltage of the converter 16 with the electromotive force of the single-phase circuit. Under conditions of recuperation, the above operation is reversed, in that the machine 6 operates as a generator and energy is supplied from the polyphase circuit 5—5'—5'' to the single-phase circuit 4—4'.

Turning now to the vector diagram of Fig. 2 for a more detailed understanding of the operation of the transformers 11 and 14 in maintaining balance, the star voltages impressed upon the motor may be indicated by vectors $E^{17}$, $E^{18}$ and $E^{19}$, respectively, and assuming a power factor of unity in the motor, the corresponding currents may be represented by vectors $I^{17}$, $I^{18}$ and $I^{19}$, respectively.

As an outward flowing current in the phase winding 19 of the converter 16 is an inward flowing current in the phase winding 19' of the motor 6, said currents are in phase opposition with respect to their associated machines and the current in the phase winding 19' of the motor 6 may be indicated by a vector $I^{19'}$ equal, and in opposition, to the vector $I^{19}$. The currents in the single-phase mains are in phase opposition and are indicated by the vectors $I^4$ and $I^{4'}$. The vectors $I^{17'}$ and $I^{18'}$ are determined by the facts that their vector sum must be equal and opposite to the vector $I^{19'}$, that the current $I^4$ must be the vector sum of the currents $I^{17}$ and $I^{17'}$ and that the current $I^{4'}$ must be the vector sum of the currents $I^{18}$ and $I^{18'}$.

From the above, it will be noted that the currents $I^{17}$ and $I^{18'}$, flowing in the windings 15 and 13, respectively, of the transformer 14, are substantially equal and opposite, and a like relation holds with respect to the currents $I^{18}$ and $I^{17'}$ flowing in the windings of the transformer 11. The two transformers are thus inactive under balanced-load conditions.

Let it now be assumed that the tertiary voltage of the converter 16 is reduced, by reason of load drops, tending, for example, to alter the vectors $E^{19}$ and $I^{19}$ in Fig. 2, thus modifying the derived electromotive forces supplied to the motor 6. The effect of a change in the current $I^{17'}$ is to unbalance the transformer 11, producing an increase or a decrease, as the case may be, in the current $I^{18}$. Thus, the tendency of said altered current $I^{17'}$ to produce a rotational distortion of the triangle $E^{17}$, $E^{18}$, $E^{19}$ with respect to the base line $I^4$—$I^{4'}$ is met by an equal and opposite tendency to rotational distortion.

It will be noted that, in the conditions thus far described, a one-to-one ratio in the transformer and unity power-factor in both the single-phase and polyphase power is assumed. The system operates equally well if the power-factors of the single-phase and polyphase circuits are other than unity, provided the power-factor is, at all times, the same in both circuits. The effect of this diversion from unity power-factor is to shift all the current vectors in Fig. 2 through a common angle with respect to the voltage vectors, while maintaining the same mutual phase relation among themselves. The desired adjustment of the power-factor of the two circuits may be obtained by the use of synchronous excitation in the converter 16, as indicated at 20, and, if desired, by the use of a phase-advancer in connection with the motor 6.

It is possible to obtain similar results, when having different power factors in the two circuits, by the use of balancing transformers of unequal size and by having other than one-to-one ratios therein but this constitutes no part of the present invention and is separately described and claimed in a copending application of R. E. Hellmund, Serial No. 193,695, filed Sept. 28, 1917, and assigned to the Westinghouse Electric & Manufacturing Company.

Turning now to the form of my invention shown in Fig. 3, single-phase mains 4—4' are employed as before to supply energy to a polyphase circuit, here indicated as of the quarter-phase type and comprising mains 5 and 5', energized directly from the mains 4 and 4' through portions of auxiliary transformers or balancing coils 25 and 26, respectively, and further comprising mains 27 and 28 connected respectively to the terminals of the tertiary winding 29 of a quarter-phase phase-converter 16 having a primary winding 30 energized from the mains 4 and 4' through the remaining portions of the balancing coils 25 and 26. Four load motors, designated 31 to 34, inclusive, are operated from the polyphase load circuit, said motors being operated in pairs, the two members of each pair being connected in double delta, and proper load division between said pairs being obtained by balancing coils 35 and 36, in a well known manner. The operation of the system of Fig. 3 is similar to that previously described, the action of the coils 25 and 26 being similar to that of the transformers 11 and 14 in the system of Fig. 1 in compensating for the ohmic and inductive drops in the phase converter.

While I have shown my invention in a plurality of preferred forms, it will be obvious to those skilled in the art that it is susceptible of various other modifications and changes without departing from the spirit thereof and I desire, therefore, that only such limitations shall be placed thereupon as are imposed by the prior art or as are specifically set forth in the appended claims.

I claim as my invention:

1. In a converting system, the combination with a single-phase circuit, of a polyphase circuit, connections from the mains of said single-phase circuit to certain mains of said polyphase circuit, a phase-converter, connections for inserting said phase-converter between said single-phase circuit and the remaining mains of said polyphase circuit, and means for inductively interlinking certain direct supply leads from said single-phase circuit to said polyphase circuit with certain leads from said single-phase circuit to said converter, respectively.

2. In a converting system, the combination with a single-phase circuit, of a polyphase circuit, connections from the mains of said single-phase circuit to certain mains of said polyphase circuit, a phase-converter, connections for inserting said phase-converter between said single-phase circuit and the remaining mains of said polyphase circuit, and means for inductively interlinking certain direct supply leads from said single-phase circuit to said polyphase circuit with certain leads from said single-phase circuit to said converter, respectively, the currents flowing in each pair of mutually interlinked leads being of relatively displaced phase.

3. In a converting system, the combination with a single-phase circuit, of a polyphase circuit, connections from the mains of said single-phase circuit to certain mains of said polyphase circuit, a phase-converter, connections for inserting said phase-converter between said single-phase circuit and the remaining mains of said polyphase circuit, and means for inductively interlinking certain direct supply leads from said single-phase circuit to said polyphase circuit with certain leads from said single-phase circuit to said converter, respectively, the currents flowing in each pair of mutually interlinked leads being of opposite phase under balanced operating conditions, whereby said inductive interlinking means is normally inactive.

4. In a converting system, the combination with a single-phase circuit, of a three-phase circuit, connections from the mains of said single-phase circuit to two mains of said three-phase circuit, a phase-converter, connections for inserting said phase-converter between the mains of said single-phase circuit and the remaining main of said three-phase circuit and means for inductively interlinking the leads from said single-phase circuit to said converter with the leads from said single-phase circuit directly to said three-phase circuit, respectively.

5. In a converting system, the combination with a single-phase circuit, of a three-phase circuit, connections from the mains of said single-phase circuit to two mains of said three-phase circuit, a phase-converter, connections for inserting said phase-converter between the mains of said single-phase circuit and the remaining main of said three-phase circuit, and means for inductively interlinking the leads from said single-phase circuit to said converter with the leads from said single-phase circuit directly to said three-phase circuit, respectively, the currents flowing in mutually interlinked leads being of relatively displaced phase.

6. In a converting system, the combination with a single-phase circuit, of a three-phase circuit, connections from the mains of said single-phase circuit to two mains of said three-phase circuit, a phase-converter, connections for inserting said phase-converter between the mains of said single-phase circuit and the remaining main of said three-phase circuit, and means for inductively interlinking the leads from said single-phase circuit to said converter with the leads from said single-phase circuit directly to said three-phase circuit, respectively, the currents flowing in mutually interlinked leads being of substantially opposite phase with respect to said interlinking means during balanced operation.

7. In a converting system, the combination with a single-phase circuit, of a three-phase circuit, connections from the mains of said single-phase circuit to two mains of said three-phase circuit, a phase-converter, connections for inserting said phase-converter between the mains of said single-phase circuit and the remaining main of said three-phase circuit, and means for inductively interlinking each lead from said single-phase circuit directly to said three-phase circuit with the lead from the other single-phase main to said converter, respectively, each inductive interlinkage being so arranged that the two currents therein are in substantial phase opposition during balanced operation.

8. In a converting system, the combination with a single-phase circuit, of a three-phase circuit, connections from the mains of said single-phase circuit to two mains of said three-phase circuit, a phase-converter, connections for inserting said phase-converter between the mains of said single-phase circuit and the remaining main of said three-phase circuit, two transformers, connections for inserting one winding of each transformer in each lead from said single-phase circuit directly to said three-phase circuit, respectively, and connections for inserting the remaining winding of each transformer in the leads between said single-phase circuit and said phase-converter, respectively, the two windings of each transformer being connected, respectively, to the different mains of said single-phase circuit and further being so connected that the currents therein are in substantial phase opposition during balanced operation, whereby, under these conditions, said transformers are substantially without flux.

9. In a converting system, the combination with a single-phase circuit, of a polyphase circuit, said circuits having substantially the same power factor, connections from the mains of said single-phase circuit to certain mains of said polyphase circuit, a phase-converter, connections for inserting said phase-converter between said single-phase circuit and the remaining mains of said polyphase circuit, and means for inductively interlinking certain direct supply leads from said single-phase circuit to said polyphase circuit with certain leads from said single-phase circuit to said converter, respectively.

In testimony whereof, I have hereunto subscribed my name this 10th day of Sept., 1917.

CHARLES LE G. FORTESCUE.

Copies of this patent may be obtained for five cents each, by addressing the "Commissioner of Patents, Washington, D. C."